(12) United States Patent
Bhowmick et al.

(10) Patent No.: US 11,989,634 B2
(45) Date of Patent: May 21, 2024

(54) PRIVATE FEDERATED LEARNING WITH PROTECTION AGAINST RECONSTRUCTION

(71) Applicant: Apple Inc., Cupertino, CA (US)

(72) Inventors: Abhishek Bhowmick, Santa Clara, CA (US); John Duchi, Menlo Park, CA (US); Julien Freudiger, San Francisco, CA (US); Gaurav Kapoor, Santa Clara, CA (US); Ryan M. Rogers, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 621 days.

(21) Appl. No.: 16/501,132

(22) Filed: Jan. 17, 2020

(65) Prior Publication Data
US 2021/0166157 A1 Jun. 3, 2021

Related U.S. Application Data

(60) Provisional application No. 62/774,227, filed on Dec. 1, 2018, provisional application No. 62/774,126, filed on Nov. 30, 2018.

(51) Int. Cl.
*G06F 17/00* (2019.01)
*G06N 3/04* (2023.01)
*G06N 5/04* (2023.01)
*G06N 20/20* (2019.01)

(52) U.S. Cl.
CPC .............. *G06N 20/20* (2019.01); *G06N 3/04* (2013.01); *G06N 5/04* (2013.01)

(58) Field of Classification Search
CPC ............. G06N 20/20; G06N 3/04; G06N 5/04

USPC ............................................................ 706/12
See application file for complete search history.

(56) References Cited

U.S. PATENT DOCUMENTS

| 11,132,602 | B1* | 9/2021 | Xie .................... G06F 9/44552 |
| 11,341,429 | B1* | 5/2022 | Pihur ....................... G06N 5/04 |
| 2012/0023043 | A1 | 1/2012 | Cetin et al. |
| 2015/0324686 | A1* | 11/2015 | Julian ...................... G06N 3/08 706/25 |
| 2017/0091652 | A1* | 3/2017 | Miao ...................... G06N 20/20 |
| 2018/0268283 | A1 | 9/2018 | Gilad-Bachrach et al. |
| 2018/0365580 | A1 | 12/2018 | Musuvathi et al. |
| 2019/0227980 | A1* | 7/2019 | McMahan ........... G06F 21/6245 |

(Continued)

OTHER PUBLICATIONS

Duchi, Local Privacy, Data Processing Inequalities, and Minimax Rates, 2014 (Year: 2014).*

(Continued)

*Primary Examiner* — Paul C McCord
(74) *Attorney, Agent, or Firm* — BAKERHOSTETLER

(57) ABSTRACT

Embodiments described herein provide for a non-transitory machine-readable medium storing instructions to cause one or more processors to perform operations comprising receiving a machine learning model from a server at a client device, training the machine learning model using local data at the client device, generating an update for the machine learning model, the update including a weight vector that represents a difference between the received machine learning model and the trained machine learning model, privatizing the update for the machine learning model, and transmitting the privatized update for the machine learning model to the server.

30 Claims, 11 Drawing Sheets

(56) References Cited

U.S. PATENT DOCUMENTS

| | | | |
|---|---|---|---|
| 2019/0279082 A1* | 9/2019 | Moloney | G06V 10/764 |
| 2019/0340534 A1* | 11/2019 | McMahan | G06F 17/18 |
| 2020/0034566 A1* | 1/2020 | Zhang | G06Q 50/01 |
| 2021/0065002 A1* | 3/2021 | Samek | G06N 3/08 |
| 2021/0097381 A1* | 4/2021 | Daykin | G06F 11/3495 |

OTHER PUBLICATIONS

Geyer: Differentially Private Federated Learning; copyright Mar. 2018 (Year: 2018).*

* cited by examiner

─── 601

Privatized Unit Vector: PrivUnit$_2$

Given: $u \in \mathbb{S}^{d-1}, \gamma \in [0,1], \varepsilon' \geq 0$.
  Draw random vector $V$ according to the following distribution, $$V = \begin{cases} \text{uniform on } \{v \in \mathbb{S}^{d-1} \mid \langle v, u \rangle \geq \gamma\} & \text{with probability } \frac{e^{\varepsilon'}}{1+e^{\varepsilon'}} \\ \text{uniform on } \{v \in \mathbb{S}^{d-1} \mid \langle v, u \rangle < \gamma\} & \text{otherwise.} \end{cases}$$

Set $\alpha = \frac{d-1}{2}, \tau = \frac{1+\gamma}{2}$
Set $m$ to be the following value $$m = \frac{(1-\gamma^2)^\alpha}{2^{d-2}(d-1)(1+e^{\varepsilon'})} \left[ \frac{e^{\varepsilon'}}{B(\alpha,\alpha) - B(\tau;\alpha,\alpha)} - \frac{1}{B(\tau;\alpha,\alpha)} \right]$$

Set $Z = \frac{1}{m} \cdot V$

Transmit: $Z$

─── 602

Privatized Unit Vector: PrivUnit$_\infty$

Given: $u \in \mathbb{H}^d, \kappa \in \{0, \cdots, d-1\}, \varepsilon' \geq 0$.
  Round each coordinate of $u = (u_1, \cdots, u_d)$ to a corner of $\mathbb{H}^d$
  for $j \in [d]$ do

$$\widehat{U}_j = \begin{cases} 1 & \text{w.p. } \frac{1+u_j}{2} \\ -1 & \text{else} \end{cases}$$

Draw random vector $V$ according to the following distribution, $$V = \begin{cases} \text{uniform on } \{v \in \{-1,+1\}^d \mid \langle v, \widehat{U} \rangle > \kappa\} & \text{with probability } \frac{e^{\varepsilon'}}{e^{\varepsilon'}+1} \\ \text{uniform on } \{v \in \{-1,+1\}^d \mid \langle v, \widehat{U} \rangle \leq \kappa\} & \text{otherwise.} \end{cases}$$

Set $\tau = \frac{\lceil \frac{d+\kappa+1}{2} \rceil}{d}$
Debias the vector $$m = \frac{1}{e^{\varepsilon'}+1} \cdot \left( \frac{e^{\varepsilon'}\binom{d-1}{d\tau-1}}{\sum_{\ell=\tau \cdot d}^{d}\binom{d}{\ell}} - \frac{\binom{d-1}{d\tau-1}}{\sum_{\ell=0}^{d\tau-1}\binom{d}{\ell}} \right)$$

Set $Z = \frac{1}{m} \cdot V$

Transmit: $Z$

─── 603

Privatized magnitude: PrivMagn

Given: $r$ magnitude, $\nu > 0$
  Sample $Y \sim \mathsf{Uni}[-\nu, \nu]$
  Set $X = 2\nu \cdot \frac{\exp(Y)}{\exp(\nu) - \exp(-\nu)}$

Transmit: $r \cdot X$

*FIG. 6A*

Privatize the magnitude with absolute error: AbsMagnDP _(604)_

Given: Magnitude $r$, privacy parameter $\varepsilon > 0$, integer $k$, bound $r_{\max}$
$r \leftarrow \min\{r, r_{\max}\}$
Sample $J \in \{0, 1, \cdots, k\}$ such that $$J = \begin{cases} \lfloor kr/r_{\max} \rfloor & \text{w.p. } (\lceil kr/r_{\max} \rceil - kr/r_{\max}) \\ \lceil kr/r_{\max} \rceil & \text{otherwise} \end{cases}$$

where $0/0$ is interpreted as 1.
Use randomized response to obtain $\widehat{J}$ $$\widehat{J} \mid (J = i) = \begin{cases} i & \text{w.p. } \frac{e^{\varepsilon}}{e^{\varepsilon}+k} \\ \text{uniform in } \{0, \ldots, k\} \setminus i & \text{w.p. } \frac{k}{e^{\varepsilon}+k}. \end{cases}$$

Debias $\widehat{J}$, by setting $$Z = a\left(\widehat{J} - b\right) \text{ for } a = \left(\frac{e^{\varepsilon}+k}{e^{\varepsilon}-1}\right)\frac{r_{\max}}{k} \text{ and } b = \frac{k(k+1)}{2(e^{\varepsilon}+k)}.$$

Transmit: $Z$

---

Privatize the magnitude with relative error: RelMagnDP _(605)_

Given: Magnitude $r$, privacy parameter $\varepsilon > 0$, integer $k$, accuracy $\alpha$, $\nu > 1$, bound $r_{\max}$.
$r \leftarrow \min\{r, r_{\max}\}$
Form the intervals $\{E_0, E_1, \cdots, E_{k-1}\}$ and let $i^*$ be the index such that $r \in E_{i^*}$.
Sample $J \in \{0, 1, \cdots, k\}$ such that $$J = \begin{cases} 0 & \text{w.p. } \frac{\nu\alpha - r}{\nu\alpha} \\ 1 & \text{w.p. } \frac{r}{\nu\alpha} \end{cases} \text{ if } i^* = 0 \quad \text{and} \quad J = \begin{cases} i^* & \text{w.p. } \frac{\nu^{i^*+1}\alpha - r}{\nu^{i^*}(\nu-1)\alpha} \\ i^* + 1 & \text{w.p. } \frac{r - \nu^{i^*}\alpha}{\nu^{i^*}(\nu-1)\alpha} \end{cases} \text{ if } i^* \geq 1.$$

Use randomized response to obtain $\widehat{J}$ $$\widehat{J} \mid (J = i) = \begin{cases} i & \text{w.p. } \frac{e^{\varepsilon}}{e^{\varepsilon}+k} \\ \text{uniform in } \{0, \ldots, k\} \setminus i & \text{w.p. } \frac{k}{e^{\varepsilon}+k}. \end{cases}$$

Set $\widetilde{J} = \nu^{\widehat{J}} \cdot \mathbb{1}\{\widehat{J} \geq 1\}$
Debias $\widetilde{J}$, by setting $$Z = a\left(\widetilde{J} - b\right) \text{ for } a = \alpha \cdot \left(\frac{e^{\varepsilon}+k}{e^{\varepsilon}-1}\right) \text{ and } b = \frac{1}{e^{\varepsilon}+k} \cdot \sum_{j=1}^{k} \nu^j.$$

Transmit: $Z$

Efficient Sampling of unit vectors in PrivUnit₂

Given: $u \in \mathbb{S}^{d-1}$ and $\gamma \in [0, 1]$.

Sample Y = Bern$\left(\dfrac{e^{\varepsilon'}}{e^{\varepsilon}+1}\right)$ if Y = 1 then

Sample $B' = 2B - 1$ where $B \sim$ Beta $\left(\dfrac{d-1}{2}, \dfrac{d-1}{2}\right)$ conditioned on $B \geq \dfrac{\gamma+1}{2}$ Set $\widehat{U} \leftarrow B' \cdot u$ Draw $U \sim \mathsf{Uni}(\mathbb{S}^{d-1})$. # Can do this by sampling a $d$ standard gaussians and then normalizing.

Set $V \leftarrow \sqrt{1 - B'^2} \cdot \dfrac{(I - uu^\mathsf{T})U}{\|(I_d - uu^\mathsf{T}) \cdot U\|_2}$ Set $V \leftarrow \widehat{U} + V$ else

Do rejection sampling, i.e.

Bool $\leftarrow$ True while Bool do

Draw $U \sim \mathsf{Uni}(\mathbb{S}^{d-1})$.

if $\langle U, u \rangle < \gamma$ then

$V \leftarrow U$

Bool = False

Provide: $V$

*FIG. 6C*

PRIVATE FEDERATED LEARNING WITH PROTECTION AGAINST RECONSTRUCTION

RELATED APPLICATIONS

This application claims the benefit of priority of U.S. Provisional Application No. 62/774,126, filed Nov. 30, 2018 and U.S. Provisional Application No. 62/774,227, filed Dec. 1, 2018, each of which is herein incorporated by reference in their entirety.

FIELD

Embodiments described herein relate generally to federated machine learning using distributed computing systems. More specifically, embodiments relate to a private federated learning system with protections against reconstruction attacks.

BACKGROUND OF THE DESCRIPTION

The training of machine learning models for use in image classification, next word prediction, and other related tasks generally makes use of powerful hardware and a large amount of data. The large amount of training data can increase the accuracy of the trained models. The more powerful the hardware, the faster the training operations can be performed. Previously, the training of machine learning models required dedicated, high-performance compute nodes. However, modern mobile electronic devices are now able to perform on-device training, even for large complex machine learning models. Training data can be divided and distributed to a large number of mobile electronic devices, which can each perform on-device training of the model using a subset of the training data. However, the training data that is used on each mobile device is generally a small fraction of the full dataset.

Computing a shared model that leverages the full dataset would significantly outperform each of the individual models trained on its own dataset. Shared models can then be deployed to each device to benefit all users for a variety of tasks, which can improve the overall user experience. One way to compute a shared model in this distributed setting is to directly transmit data from each device to a central server where training can be done. However, the data on each device is sensitive by nature and transmitting user data to a centralized server can compromise the privacy of user data.

SUMMARY OF THE DESCRIPTION

Various embodiments of a private federated learning system with protections against reconstruction attacks will be described herein.

One embodiment provides for a data processing system comprising a memory to store instructions and one or more processors to execute the instructions. The instructions cause the one or more processors to receive a machine learning model from a server at a client device, train the machine learning model using local data at the client device to generate a trained machine learning model, generate an update for the machine learning model, the update including a weight vector that represents a difference between the machine learning model and the trained machine learning model, privatize the update for the machine learning model, and transmit the privatized update for the machine learning model to the server.

One embodiment provides for a method comprising receiving a machine learning model from a server at a client device, training the machine learning model using local data at the client device to generate a trained machine learning model, generating an update for the machine learning model, the update including a weight vector that represents a difference between the machine learning model and the trained machine learning model, privatizing the update for the machine learning model, and transmitting the privatized update for the machine learning model to the server.

One embodiment provides for a non-transitory machine-readable medium that stores instructions to cause one or more processors of a data processing system to perform operations comprising receiving a machine learning model from a server at a client device, training the machine learning model using local data at the client device, generating an update for the machine learning model, the update including a weight vector that represents a difference between the received machine learning model and the trained machine learning model, privatizing the update for the machine learning model, and transmitting the privatized update for the machine learning model to the server.

In embodiments described herein, privatizing the update for the machine learning model can be performed using a variety of mechanisms, including the use of a separated differential privacy mechanism that separately privatizes a unit vector and a magnitude for each update to the machine learning model before the update is transmitted by the user device. Privatizing the update using separated differential privacy includes decomposing the weight vector into a unit vector and a magnitude, privatizing the unit vector, and separately privatizing the magnitude. In one embodiment the magnitude is privatized with absolute error. In one embodiment the magnitude is privatized with relative error. In one embodiment the unit vector is privatized based on $\ell_2$-unit vectors on the unit cube. In one embodiment, the unit vector is privatized based on $\ell_\infty$-unit vectors on the unit cube.

Other features and advantages will be apparent from the accompanying drawings and from the detailed description.

BRIEF DESCRIPTION OF THE DRAWINGS

Various embodiments and aspects of a private federated learning system will be described herein, with reference to details discussed below. The described embodiments are illustrated by way of example and not limitation in the figures of the accompanying drawings, in which like references indicate similar elements, and in which:

FIG. 6A-6C illustrate algorithms to generate a privatized unit vector and privatized magnitude, according to embodiments;

DETAILED DESCRIPTION

Figure 1:
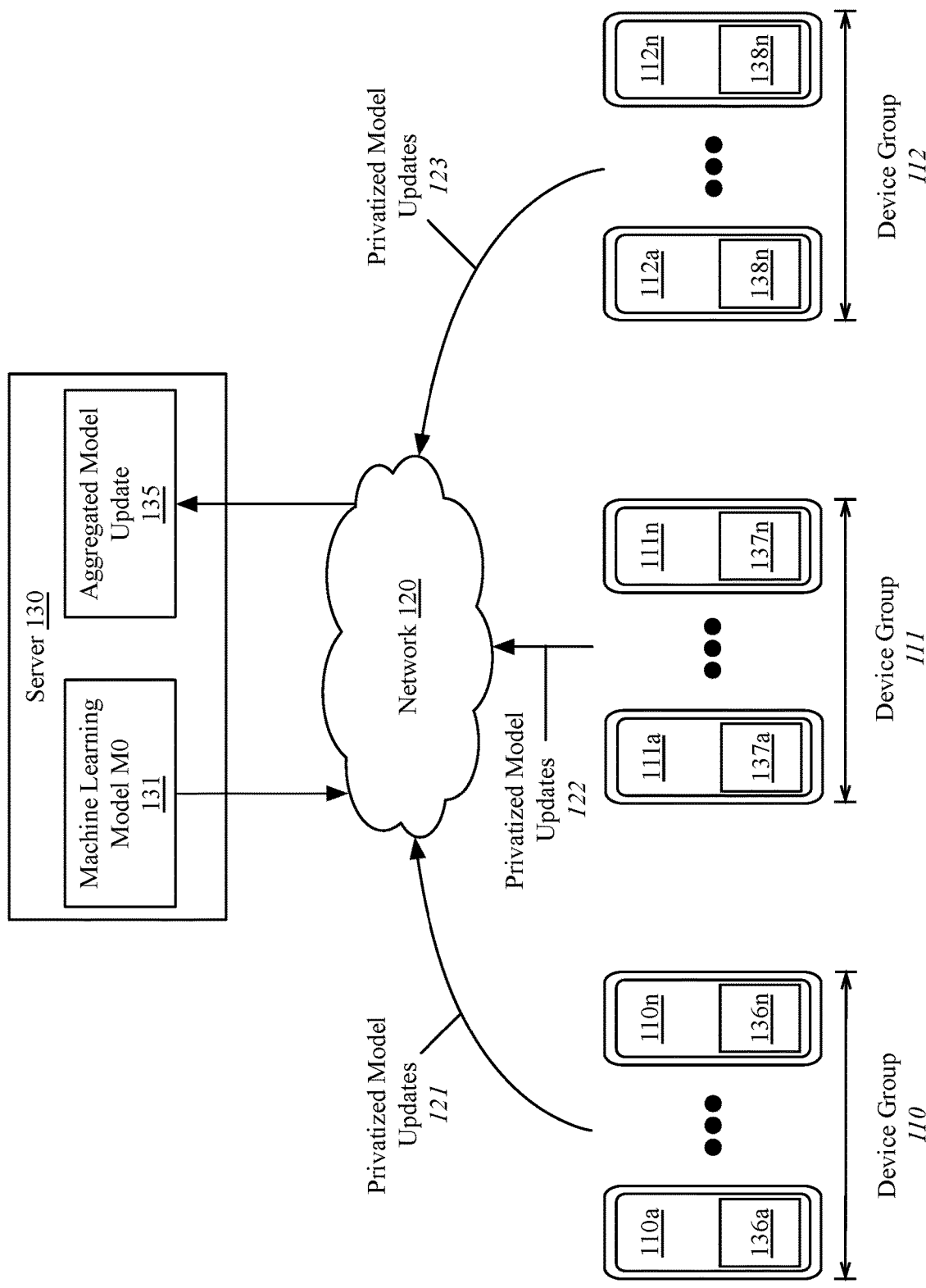
FIG. 1 illustrates a system to enable private federated learning, according to an embodiment.

Federated learning, also referred to as distributed learning, focuses on learning problems when data is distributed across many devices. Let $\theta \in \Theta$ be model parameters for a particular model that is to be trained using user data. In federated learning, the model parameters $\theta$ are transmitted to each device and then each device trains a local model using its local data. The locally trained model on device i becomes $\theta_i$ and the difference between the starting model parameters and the locally trained parameters $\Delta_i = \theta_i - \theta$ are sent to a central server. A collection of b model differences $\{\Delta_1, \ldots, \Delta_b\}$ is then aggregated to obtain $\Delta$ on a central server which is then used to update the central model parameters $\theta \leftarrow \theta + \Delta$. The update to the shared model can then be deployed to the mobile devices. This feedback loop continues as the model improves and the user data changes.

Some approaches to federated learning, even when performing on-device training, does not provide any formal privacy guarantees to users that participate in the federated learning system. Even though data remains on device, the transmitted model updates are computed with user data and contain information about the personal data. A curious onlooker that has access to the model updates may be able to reconstruct data of individual users.

One approach for incorporating privacy into federated learning is to use differential privacy on the server, typically called the central model of differential privacy. Differential privacy has many nice properties, including closure under post-processing and the graceful degradation of privacy parameters if multiple differential privacy algorithms are composed together, that has made it the de facto privacy definition in data analytics and machine learning. However, an objection to differential privacy in the central model is that the users submit their data, perhaps through an encrypted channel, that is then decrypted on the server. Thus, the server is trusted to use a differential privacy algorithm with the data to only reveal a privatized result. An adversary with access to the server may be able to see the true model updates prior to any execution of a differential privacy algorithm.

Another approach to protecting the individual updates is to use secure multiparty computation (SMC). However, with SMC, the communication cost of a user scales with the number of users that are selected to submit updates. In this setting, it is assumed that users remain online for multiple rounds of communication, which may be unrealistic in practical settings. Further, the on-device computational difficulty scales linearly with the dimension of the model and the number of users contributing updates, which may be prohibitively expensive. An optimal approach would ensure privacy with minimal impact to computation cost on device and communication cost between the devices and the server.

Local privacy protections provide numerous benefits including avoiding risks associated to maintaining private data. Additionally, local privacy protections allow transparent protection of user privacy, as private data never leaves an individual's device in the clear. However, local differential privacy can create challenges for learning systems.

Embodiments described herein address the above deficiencies in the art by providing a private federated learning system that privatizes model updates submitted by users via a separated differential privacy model with protections against adversaries with some prior information about user updates. Separated differential privacy involves decomposing the weight vector that includes updates to a learning model into a unit vector and an associated magnitude. The decomposed vectors can then be separately privatized using techniques described herein. Separated differential privacy enables privatized learning by implementing a privacy model that is tailored towards protecting against an attacker that may wish to decode individual user data based on model updates, rather than an attacker that wants to differentiate between two inputs. This approach allows the use of a more relaxed privacy parameter $\varepsilon$, which improves the effectiveness of the learning process, while still providing protection against curious onlookers that may be able to obtain access to privatized model updates.

This model of privacy is well suited to federated learning scenarios that use distributed model training. Separated differential privacy enables learning models to be trained in a decentralized setting while providing local privacy guarantees for the transmitted model updates from the devices. Using separated differential privacy, a private federated learning system can be enabled that provides comparable utility to a federated learning system that does not provide privacy safeguards. Privacy is enabled by obfuscating the individual updates to the server. In one embodiment a relaxed privacy parameter $\varepsilon$ is used, user data is still protected against reconstruction by individuals (e.g., internal employees) that may have access to privatized updates. In one embodiment, fully $\varepsilon$-differentially-private techniques are used to enable privatization of the magnitude. In another embodiment, relative noise mechanisms are used to privatize the magnitude.

In addition to separated differential privacy, an additional layer of privacy is enabled by encapsulating the separated differential privacy model within a central differential privacy layer on the learning server. The use of central differential privacy provides additional protection for updated learning models on the server against external adversaries that may have access to the model and any other information except the user data that the adversary wishes to decode.

In the description and figures, numerous specific details are described to provide a thorough understanding of various embodiments. However, in certain instances, well-known or conventional details are not described to provide a concise discussion of embodiments. Additionally, reference herein to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment. It should be noted that there could be variations to the flow diagrams or the operations described therein without departing from the embodiments described herein. For instance, operations can be performed in parallel, simultaneously, or in a different order than illustrated.

FIG. 1 illustrates a system 100 to enable private federated learning, according to an embodiment. In one embodiment the system 100 includes a server 130 that can receive data from a set of client devices 110*a*-110*n*, 111*a*-111*n*, 112*a*-112*n* over a network 120. The server 130 can be any kind of server, including an individual server or a cluster of servers. The server 130 can also be or include a cloud-based server, application server, backend server, virtual server, or combination thereof. The network 120 can be any suitable type of wired or wireless network such as a local area network (LAN), a wide area network (WAN), or combination thereof. Each of the client devices can include any type of computing device such as a desktop computer, a tablet computer, a smartphone, a television set top box, a smart speaker system, a gaming system, or other computing device. For example, a client device can be an iPhone®, Apple® Watch, Apple® TV, HomePod™, etc., and can be associated with a user within a large set of users to which tasks can be crowd-sourced with the permission of the user.

In one embodiment, the server 130 stores a machine learning model 131 (e.g., model M0), which can be implemented using one or more neural networks, such as but not limited to a deep learning neural network. The machine learning model 131 can be implemented using, for example, a convolutional neural network (CNN) or a recurrent neural network (RNN), including a long short-term memory (LSTM) variant of an RNN. Other types of machine learning models and/or neural networks can be used. The machine learning model 131 can include a set of model weights that can be updated based on an aggregated model update 135 that is generated based on aggregated privatized model updates sent from the set of client devices 110a-110n, 111a-111n, 112a-112n.

The client devices can be organized into device groups (e.g., device group 110, device group 111, device group 112) that can each contain multiple client devices. Each device group can contain n devices, where n can be any number of devices. For example, device group 110 can contain client device 110a-110n. Device group 111 can contain client device 111a-111n. Device group 112 can contain client device 112a-112n. In one embodiment, each device group can contain up to 128 devices, although the number of client devices in each device group can vary across embodiments and is not limited to any specific number of devices.

In one embodiment, each of the client devices (client device 110a-110n, client device 111a-111n, client device 112a-112n) can include a local machine learning module. For example, client device 110a-110n of device group 110 can each contain corresponding local machine learning module 136a-136n. Client device 111a-111n of device group 111 can each contain corresponding local machine learning module 137a-137n. Client device 112a-112n of device group 112 can each contain a corresponding local machine learning module 138a-138n. In various embodiments, the local machine learning modules can be loaded on each client device during factory provisioning or can be loaded or updated when a system image of the client device is updated. In one embodiment, the machine learning model 131 of the server 130 can be transmitted to each local machine learning module over the network 120. The local machine learning models on the client devices can be individualized to each client device by training the local models using local data stored on the client device. In one embodiment, different types of data can be used to train the models, and the specifics of the models can vary based on the type of data that is used to train. In one embodiment the machine learning model 131 and the local machine learning models are image classifier models. In one embodiment the models are natural language processing models that are used to enable a predictive keyboard and/or keyboard autocorrect. In one embodiment the models can be voice recognition or voice classification models that are used to improve voice recognition or voice classification capability for a virtual assistant.

The local machine learning modules 136a-136n, 137a-137n, 138a-138n on each client device can generate model updates that are privatized by the client devices 110a-110n, 111a-111n, 112a-112n before transmission to the server 130. For example, client devices 110a-110n can each send privatized model updates 121, client devices 111a-111n can each send privatized model updates 122, and client devices 112a-112n can each send privatized model updates 123. The privatized model updates can be sent through the network 120 to the server 130, where the updates can be processed into an aggregated model update 135. Updates are sent to the server while satisfying separated differential privacy for the local updates and no raw data for users is transmitted to the server. Separated differential privacy is used to protect the privatized model updates 121, 22, 123 from a reconstruction breach. A reconstruction breach occurs when a curious onlooker having access to the model updates is able to determine at least some detail about the user data on which the model is trained.

Consider the models updates as being a high dimensional vector $W \in \mathbb{R}^d$, which is the difference between the original model weights and the model weights after training with the local data X. The private federated learning system described herein is configured such that adversaries that can view the transmitted updates $M(W)=Z$ (where $M: \mathbb{R}^d \to \mathcal{Z}$ is some mechanism) cannot construct an estimator based on Z that can be close to W, or any target function $f$ of W within some tolerance $\alpha$.

Figure 2:
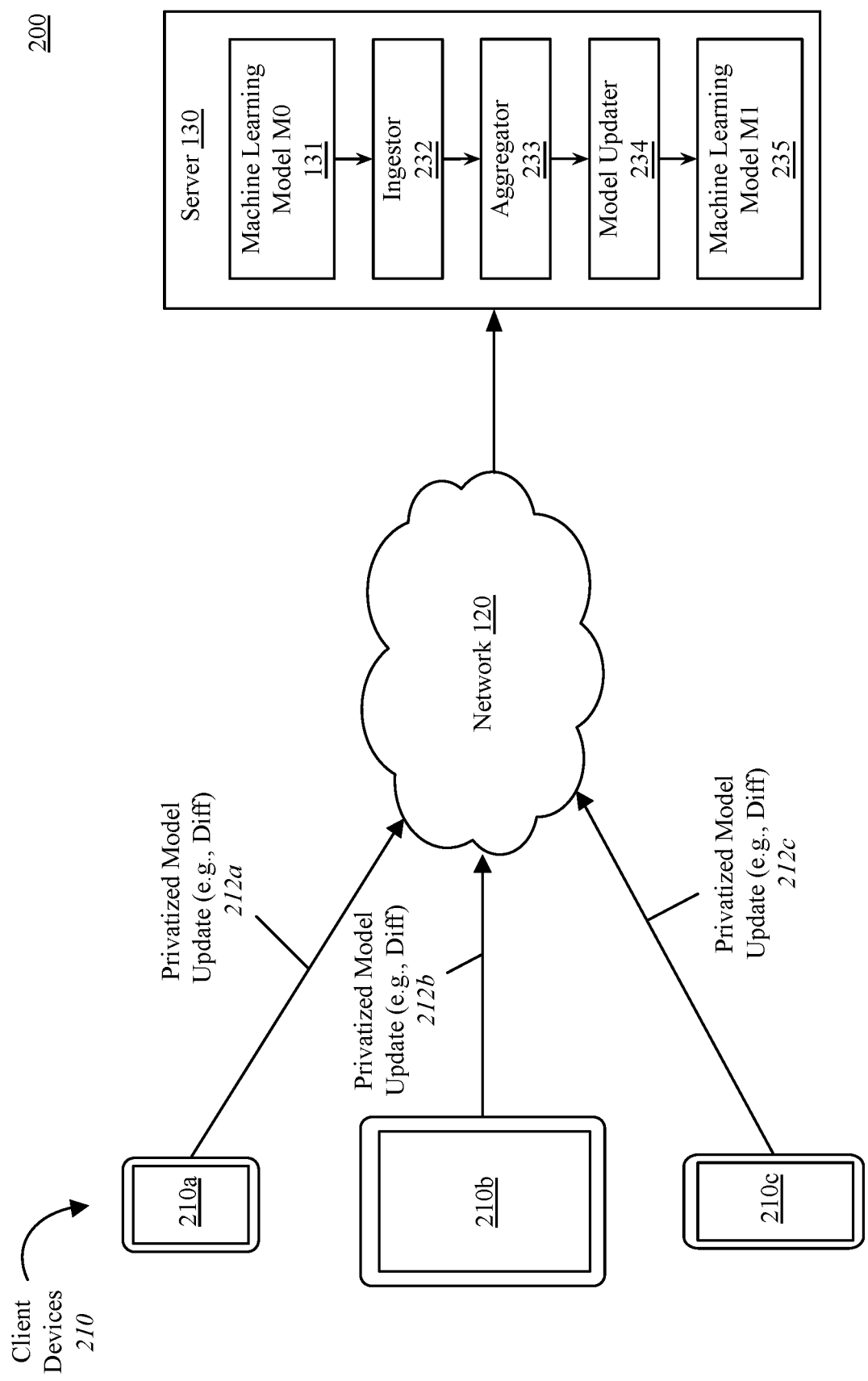
FIG. 2 illustrates an additional system to enable private federated learning, according to embodiments described herein.

FIG. 2 illustrates an additional system 200 to enable private federated learning, according to embodiments described herein. In one embodiment, the system 200 includes a set of client devices 210a-210c (collectively, 210), which can be any of the client devices described above (e.g., client devices 110a-110n, 111a-111n, 112a-112n). The client devices 210, using the techniques described above, can generate privatized model updates 212a-212c (e.g., privatized model update 212a from client device 210a, privatized model update 212b from client device 210b, privatized model update 212c from client device 210c), which can be transmitted to the server 130 via the network 120. The privatized model updates 212a-212c can be stripped of their IP addresses or other information that can be used to identify the client devices 210 prior to entering an ingestor 232 on the server 130. The ingestor 232 can collect the data from the client devices 210 and remove metadata and forwards the data to an aggregator 233. The aggregator takes the privatized model updates and aggregates them to form a single update to the current server model, which in the initial round is machine learning model 131 (e.g., model M0). A model updater 234 can then apply the updates to the current server model to generate an updated machine learning model 235 (e.g., model M1). The privatized model updates 212a-212c can be protected using separated differential privacy as described herein. The aggregated model updates and/or updated machine learning model 235 can be protected using the central model of differential privacy.

Figure 3:
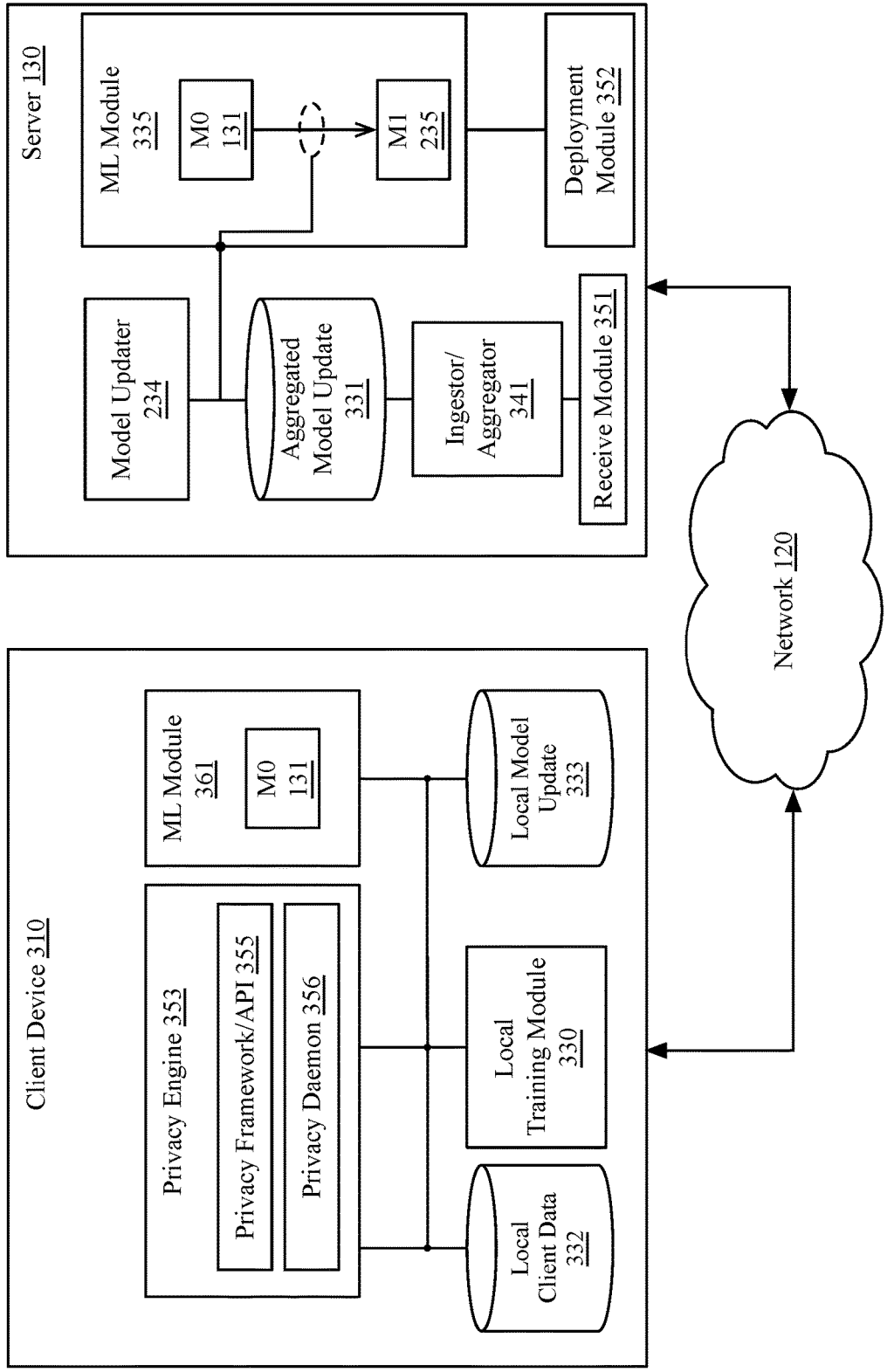
FIG. 3 is a block diagram of a system for generating privatizing model updates, according to an embodiment.

FIG. 3 is a block diagram of a system 300 for generating privatizing model updates, according to an embodiment. The system 300 includes a client device 310, which can be any of client devices 110a-110n, 111a-111n, 112a-112n or client devices 210. The client device 310 includes a machine learning module 361 that includes, at least initially, a copy of machine learning model 131, which can be provided by the server 130. A local training module 330 can be used to train the machine learning model 131 based on local client data 332 to generate a local model update 333. The local model update 333 is then privatized using a privacy engine 353. In one embodiment the privacy engine 353 includes a privacy daemon 356 and a privacy framework or application programming interface (API) 355. The privacy engine 353 can use various tools, such as hash functions, including cryptographic hash functions, to privatize the local model update 333 to the machine learning model 131 using one or more of a variety of privatization techniques including but not limited to separated differential privacy as described herein. The privatized local model update 333 can then be transmitted to the server 130 via the network 120.

The server 130 can include a receive module 351 and an ingestor/aggregator 341. The receive module 351 can asynchronously receive privatized model updates from a large plurality of client devices and provide the updates to the ingestor/aggregator 341. The receive module 351 can remove latent identifiers such as IP addresses or other data that might identify the client device 310. The ingestor/aggregator can include components of the ingestor 232 and aggregator 233 shown in FIG. 2 and can perform similar operations, such as removing metadata, session identifiers, and other identifying information, and aggregating the privatized information to generate an aggregated model update 331. The aggregated model update 331 can be used by the model updater 234 to update machine learning model 131 (e.g., model M0) into updated machine learning model 235 (e.g., model M1). A deployment module 352 can then be used to deploy the updated machine learning model 235 to the client devices for an additional round of training. While the updated machine learning model 235 is on the server 130, the model can be protected using central differential privacy.

Figure 4:
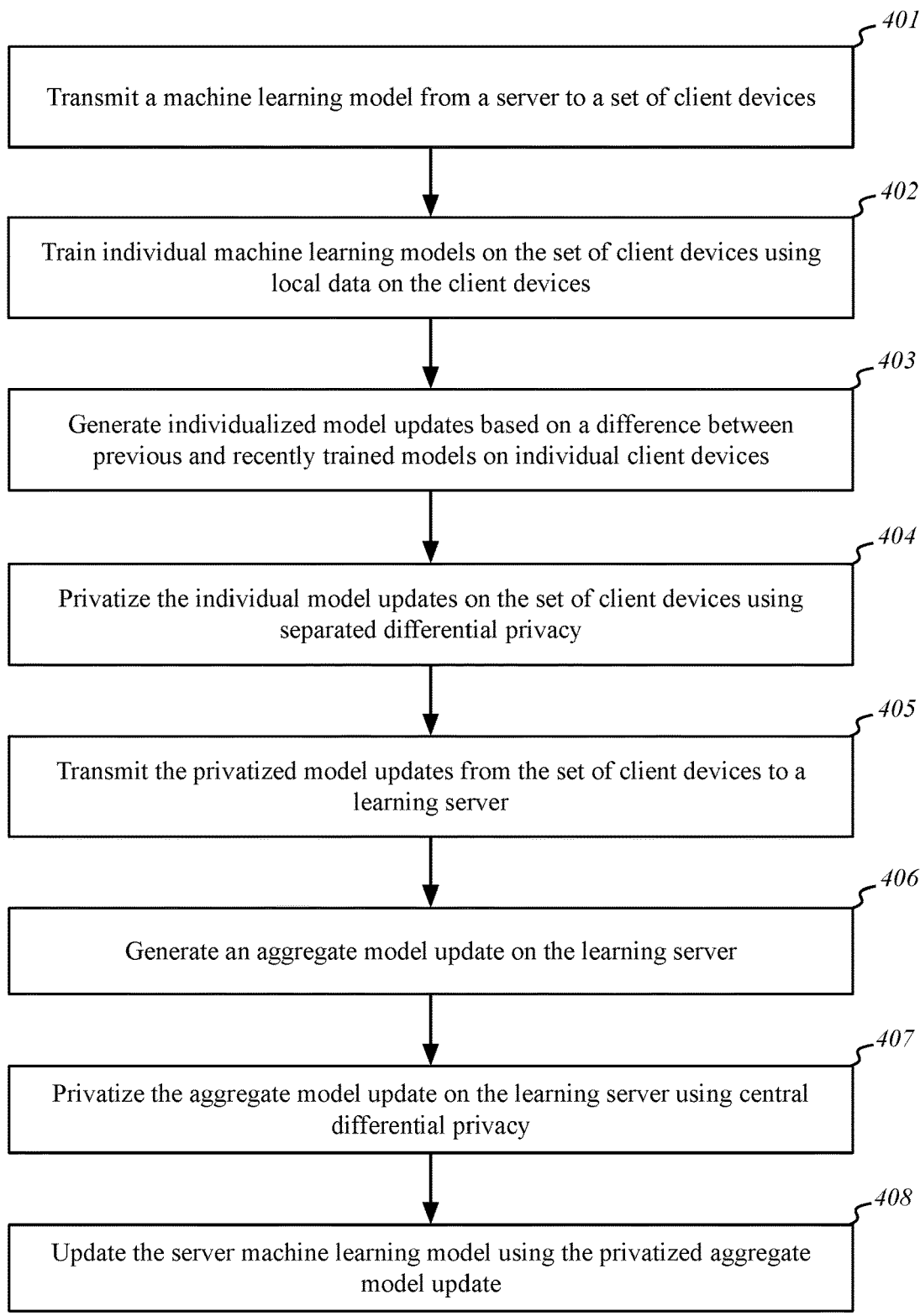
FIG. 4 is a flow diagram of a method of performing private federated learning using the computing components and privatization techniques described herein.

FIG. 4 is a flow diagram of a method 400 of performing private federated learning using the computing components and privatization techniques described herein. Operations of the method 400 will be described below, along with relevant mathematical descriptions of the operations to be performed. The method 400 includes operations (block 401) to transmit a machine learning model from a server to a set of client devices. Let $\theta \in \Theta$ be model parameters for a particular model that is to be trained using user data. The model parameters $\theta$ are transmitted to each device in a set of client devices. The server can be, for example, server 130 as described herein. The client devices can be, for example, client devices 110a-110n, 111a-111n, 112a-112n, client devices 210, or the client device 310 as described herein. Each client device then performs operations (block 402) to train an individual machine learning model using local data on the client device. For example, the locally trained model on device i becomes $\theta_i$ and the difference between the starting model parameters and the locally trained parameters $\Delta_i = \theta_i - \theta$ are determined. Individualized model updates can be generated based on an individualized difference between a previous model (e.g., starting model, previous model iteration, etc.) and a most recent locally trained model on the individual client devices (block 403). The individual model updates can then be privatized on the set of client devices using separated differential privacy (block 404). The privatized model updates are then sent from the set of client devices to a central learning server (block 405). A collection of b model differences $\{\Delta_1, \ldots, \Delta_b\}$ is then aggregated to obtain an aggregate model update $\Delta$ on the central server (block 406). The aggregate model update can then be used to update the central model parameters $\theta \leftarrow \theta + \Delta$. The update to the shared model can then be deployed to the client devices. These operations can continue in a loop continues as the model improves and user data changes. In one embodiment, central differential privacy techniques are used to protect the model updates on the server. Method 400 can additionally include to privatize the aggregate model updates on the learning server using central differential privacy (block 407). The privatized model updates can then be used to update the server machine learning model (block 408). Additional details are provided below for the operations of method 400.

With respect to the operations (block 401) to transmit the machine learning model to the set of client devices, the server has some global model parameters $\theta \in \mathbb{R}^d$, which can be the model weights for each layer of a neural net or it can be the model weights of just the last layer in the case of transfer learning. Each model can have a particular neural net architecture and loss function, which in one embodiment are assumed to be consistent across devices. Each model also has some set of hyperparameters $\mathcal{H}$ which will include parameters such as learning rate, dropout rate, mini-batch size, number of rounds for training, trainable parameters, etc. These hyperparameters are tuned on the server and sent along with the current server model $\theta \in \mathbb{R}^d$, to each device. The server then sends the current model $\theta$ to a batch of devices, where each device will train the model using local data. The batch of devices will be of expected size q·N where N is the total number of users opted in for training and q is the subsampling rate, so that user i will be selected for local training with probability q. The selected batch can be denoted as $\mathcal{B} \subseteq [n]$.

With respect to the operations (block 402) to perform on-device training, user data is leveraged to update central model parameters $\theta$. Let user i have a dataset with $n_i$ example-label pairs $x_i = \{x_{i,1}, \ldots, x_{i,n_i}\}$, each $i \in B$ performs $$\theta_i \leftarrow \text{Update}(x_i, \theta; \mathcal{H})$$

where Update denotes the update rule on each device. Any update procedure can be used. A possible update rule includes Gradient Descent, where for learning rate $\eta \in \mathcal{H}$ $$\text{Update}(x_i, \theta; \mathcal{H}) := \theta - \eta \cdot \frac{1}{n_i} \sum_{j=1}^{n_i} \nabla \ell(\theta, x_{i,j}).$$

Alternatively, a gradient update with step size $\alpha_i \in \mathcal{H}$ can be performed such that $$\text{Update}(x_i, \theta; \mathcal{H}) := \theta - \alpha_i \cdot \frac{1}{m} \sum_{j=1}^{m} \nabla \ell(\theta, x_{i,j}).$$

Alternatively, stochastic proximal-point-type updates can be applied, such that $$\text{Update}(x_i, \theta; \mathcal{H}) := \underset{\theta}{\arg\min} \left\{ \frac{1}{m} \sum_{j=1}^{m} \ell(\theta, x_{i,j}) + \frac{1}{2\alpha_i} \|\theta - \theta_0\|_2^2 \right\}.$$

With respect to the operations to generate individualized model updates (block 403), privatize the individual model updates (block 404), and transmit the privatized model updates (block 405), a privatized version of model differences $\Delta_i = \theta_i - \theta$ are generated for transmission to the server using a separated mechanism, rather than submitting $\Delta_i$ directly to the server. Where $Z_1$ is an unbiased (private) estimate of $\Delta_i / \|\Delta_i\|$ and $Z_2$ is an unbiased estimate of $\|\Delta_i\|$, a value $\hat{\Delta}_i = Z_1 Z_2$ is transmitted to the server.

In one embodiment a privatized difference $\hat{\Delta}_i$ is transmitted via a separated differential privacy algorithm. In one embodiment, privatized difference $\hat{\Delta}_i$ is generated by a combination of a unit vector privatization technique, PrivUnit$_2$ and a magnitude privatization technique AbsMagnDP, where the pair is separated differentially private, such that $$\hat{\Delta}_i \leftarrow PrivUnit_2\left(\frac{\Delta_i}{\|\Delta_i\|_2}, \gamma, \varepsilon'\right) \cdot AbsMagnDP(\|\Delta_i\|_2, \nu).$$

In one embodiment, privatized unit vectors can also be generated via a mechanism PrivUnit$_\infty$, while magnitudes can be privatized via mechanisms PrivMagn or RelMagnDP, which are described in further detail in FIG. 6A-6C.

To generate an aggregate model update on the learning server (block 406), once the server has all the privatized updates from each device in the selected batch $\mathcal{B}$, i.e. $\{\hat{\Delta}_i \in \mathcal{B}\}$, the server then aggregates the privatized updates to form a single update to the server model. The server can clip each gradient update with function Clip for radius S>0, where $$Clip(\hat{\Delta}_i; S) = \hat{\Delta}_i \cdot \min\{S/\|\hat{\Delta}_i\|_2, 1\}.$$

The aggregated update then becomes the following for N users, where each device's update is weighted equally $$\hat{\Delta} \leftarrow \frac{1}{qN} \sum_{i \in \mathcal{B}} Clip(\hat{\Delta}_i; S).$$

Alternatively, given a collection of privatized updates $\{\hat{\Delta}_i\}_{i \in \mathcal{B}}$, aggregation can be performed by projecting each update onto an $\ell_2$-ball of radius S>0. Letting $\pi_S(v) = v \min\{S/\|v\|_2, 1\}$ denote this projection, the aggregate update can be defined as $$\hat{\Delta} \leftarrow \frac{1}{qN} \sum_{i \in \mathcal{B}} \pi_S(\hat{\Delta}_i).$$

For online stochastic gradient settings, where $\Delta_i = \alpha \nabla \ell(\theta, x_i)$ for a stepsize $\alpha$ that decreases to zero as the iterative procedure continues, we eventually have (with probability 1) that $\|\nabla \ell(\theta, x_i)\|_2 \leq r/\alpha$ for any $r > 0$ as $\alpha \downarrow 0$. The truncation to a radius S allows central privacy protections.

Local privatization with separated differential privacy provides strong safeguards against reconstruction breaches from adversaries with some prior knowledge. Aggregate model privatization (block 407) is performed to prevent any one user from substantially impacting the overall server model with their local data, to prevent overfitting, and to enable privacy for server data. Aggregate model privatization is performed by incorporating central differential privacy into the separated differential privacy model used for model updates.

In one embodiment, the aggregate update $$\hat{\Delta} \leftarrow \frac{1}{qN} \Sigma_{i \in \mathcal{B}} \pi_S(\Delta_i)$$

described above has $\ell_2$-sensitivity at most S/(qN) (modifying a single update $\Delta_i$ can cause $\hat{\Delta}$ to change by at most S/(qN) in $\ell_2$-distance). Consequently, addition of appropriate Gaussian noise enables a guarantee of $(\varepsilon, \delta)$-approximate differential privacy. Assuming computation of a total of T global updates, and where $\varepsilon > 0$ and $\delta \in (0,1)$ are the desired approximate privacy parameters. Letting $$Z \sim N(0, S^2 \sigma^2 I_d), \sigma^2 := \frac{4q^2 T \log \frac{1}{\delta}}{\varepsilon^2}, \theta \leftarrow \theta + Z. \quad (11)$$

Then each update to $\theta$ is $(\varepsilon, \delta)$-differentially private.

Privacy definitions for central differential privacy and separate differential privacy as used by embodiments described herein are provided below.

It can be said that two datasets D, D'$\in \mathcal{D}$ are neighboring if D is the same as D' except at most one datum is added to or removed from D'. In the central setting, an algorithm M: $\mathcal{D} \to \Upsilon$ is $(\varepsilon, \delta)$-differentially private if for all neighboring datasets D, D'$\in \mathcal{D}$ and for all outcome sets $S \subset \gamma$ we have $$\mathbb{P}[M(D) \in S] \leq e^\varepsilon \mathbb{P}[M(D') \in S] + \delta$$

The privacy model used for private federated learning as described herein considers settings in which a random variable W over domain $\mathcal{W}$ is present, with two corresponding downstream variables U from domain $\mathcal{U}$ and R from domain $\mathcal{R}$, governed by the Markovian graphical structure U←W→R. The variable W may correspond to the gradient $\nabla \ell(\theta; X)$ of the loss at the current parameter $\theta$ with data X (or otherwise a particular model update), while $U = W/\|W\|_2$ is its normalized value and $R = \|W\|_2$ is its radius or norm.

Figure 5A:
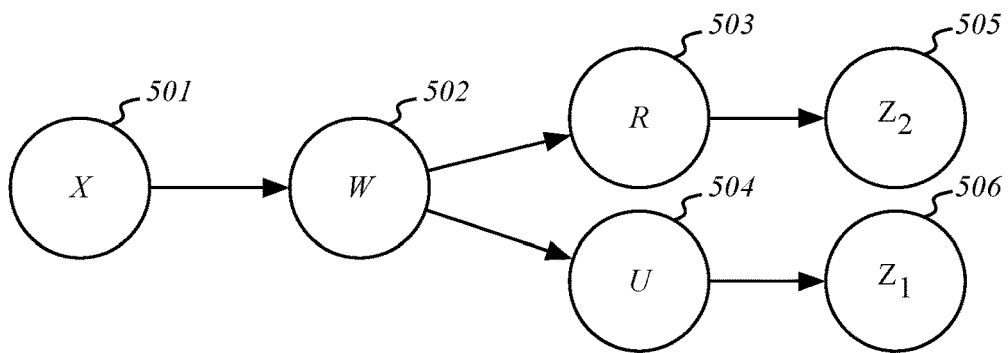
FIG. 5A-5B illustrates techniques for privatizing model updates, according to an embodiment.
Figure 5B:
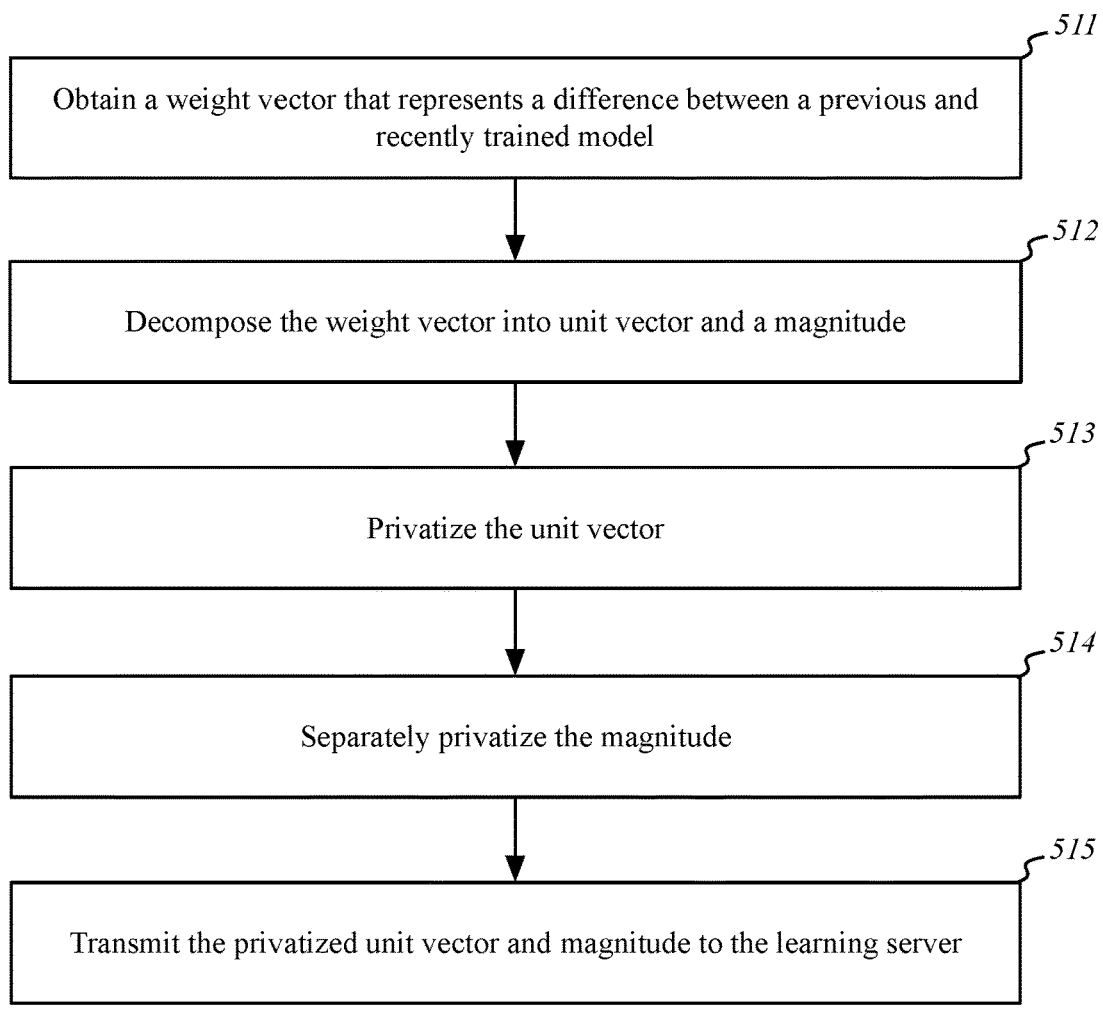

FIG. 5A-5B illustrates techniques for privatizing model updates, according to an embodiment. FIG. 5A illustrates a Markovian graphical structure 500 between data X and privatized pair $(Z_1, Z_2)$. Considering a setting in which a user or study participant has data X (501) which is intended to remain private. Data X is transformed into a vector W (502), which may simply be an identity transformation, but can also be a gradient of the loss $\ell$ on the datum X or other derived statistic. Vector W can be represented by unit direction U(504), where $U = W/\|W\|_2$ and magnitude R(503), where $R = \|W\|_2$. Unit direction U(504) and magnitude R(503) can be privatized into privatized unit vector $Z_1$(506) and privatized radius or magnitude $Z_2$(505). In light of this graphical structure, embodiments described herein present several mechanisms $M_1: \mathcal{U} \to Z_1$ and $M_2: \mathcal{R} \to Z_2$ that map pair (U,R) into privatized pair $(Z_1, Z_2)$.

The mechanism $M: \mathcal{U} \times \mathcal{R} \to Z_1 \times Z_2$ can be written as the pair $M(U,R) = (M_1(U), M_2(R)) = (Z_1, Z_2)$. The pair $(Z_1, Z_2)$ does not give substantial information about the input, which allows separated differential privacy to protect against reconstruction breaches. The separated differential privacy protections are specifically tailored to protect against certain curious onlooker adversaries, which can be represented by prior distributions over the triple (U, W, R).

To define separated differential privacy, consider the triples (U, W, R) with the Markovian graphical structure described above. A pair of mechanisms $M_1, M_2$ mapping from $\mathcal{U} \times R$ to $Z_1 \times Z_2$ is $(\varepsilon, \rho)$-separated differentially private if $M_1$ is $\varepsilon$-differentially and $M_2$ is $\rho$-differentially private.

(i) The mechanism $M_1: \mathcal{U} \to Z_1$ is $\varepsilon$-differentially private, i.e. for any $u, u' \in \mathcal{U}$ and outcome set $S \subset Z_1$, $$\frac{\mathbb{P}(M_1(u) \in S)}{\mathbb{P}(M_1(u') \in S)} \leq e^\varepsilon.$$

(ii) The mechanism $M_2: \mathcal{U} \to \mathcal{Z}_2$ is $\rho$-differentially private, i.e. for any r, r'∈R and outcome set $S \subset \mathcal{Z}_2$, $$\frac{\mathbb{P}(M_2(r) \in S)}{\mathbb{P}(M_2(r') \in S)} \leq e^\rho$$

The algorithms above enable separated differential privacy and can be shown to be sufficient to guarantee strong reconstruction protections for high-dimensional data for a large range of ε, ρ parameters when the adversary knows relatively little a priori about the actual input.

FIG. 5B illustrates a method 510 of privatizing model updates, according to an embodiment. Method 510 can be performed on a client device (e.g., client device 310) of the set of client devices selected to send a model update to a model update server (e.g., server 130). In one embodiment, method 510 includes an operation (block 511) to obtain a weight vector that represents a difference between a previous and recently trained model. This difference represents the model update that is to be transmitted to the learning server to update the current server model. Method 510 additionally includes an operation (block 512) to decompose the weight vector into a unit vector (e.g., unit direction $U=W/\|W\|_2$) and a magnitude (e.g., radius $R=\|W\|_2$). Method 500 additionally includes an operation (block 513) to privatize the unit vector. The unit vector can be privatized via mapping mechanism $M_1: \mathcal{U} \to \mathcal{Z}_1$ described above. In one embodiment the unit vector is privatized using a technique (PrivUnit$_2$) to minimize the $\ell_2$-norm of the privatized vector. Other techniques can also be used. In one embodiment the unit vector can be privatized based on $\ell_\infty$-unit vectors on the unit cube, i.e., $u \in \mathbb{H}^d := \{u \in \mathbb{R}^d: \|u\|_\infty = 1\}$ (e.g., PrivUnit$_\infty$).

Method 510 additionally includes an operation (block 514) to separately privatize the magnitude. The magnitude can be privatized via mapping mechanism $M_2: \mathcal{R} \to \mathcal{Z}_2$ described above. The mapping mechanism can be based on relative noise (PrivMagn) and will be privatized based on assumptions made about the availability of the data available to the attacker. The mapping mechanism can also be a differentially private mechanism, which can be an absolute error-based mechanism (AbsMagnDP) or a relative error-based mechanism (RelMagnDP).

Method 510 additionally includes an operation (block 515) to transmit the privatized unit vector and magnitude to the learning server as the model update. For example, where the model update is represented by model difference $\hat{\Delta}_i$, the model difference is transmitted as differentially private pair PrivUnit$_2$ and PrivMagn, where the pair is separated differentially private, such that $$\hat{\Delta}_i \leftarrow PrivUnit_2\left(\frac{\Delta_i}{\|\Delta_i\|_2}, \gamma, \varepsilon'\right) \cdot AbsMagnDP(\|\Delta_i\|_2, \nu).$$

Alternatively, the unit vector for the model difference can be transmitted using mechanism PrivUnit$_\infty$ which is based on $\ell_\infty$-unit vectors. The magnitude can also be privatized using a relative noise-based mechanism RelMagnDP or a relative error-based mechanism PrivMagn under additional assumptions about the adversary.

FIG. 6A-6C illustrate algorithms to generate a privatized unit vector and privatized magnitude, according to embodiments. FIG. 6A illustrates methods 601, 602, 603 to generate a privatized unit vector and privatized magnitude, according to embodiments. In one embodiment, method 601 can be used to generate privatized unit vector PrivUnit$_2$. Specifically, method 601 takes as input unit vector $u \in \mathbb{S}^{d-1}$ and parameter $\gamma \in [0,1]$ and returns privatized vector Z, which has the property that $\mathbb{E}[Z|u]=u$. The mechanism of method 601 then draws a vector V uniformly from a cap $\{v \in \mathbb{S}^{d-1} | \langle v, u \rangle > \gamma\}$ with probability $$\frac{e^{\varepsilon'}}{1 + e^{\varepsilon'}}$$

or otherwise uniformly from its complement $\{v \in \mathbb{S}^{d-1} | \langle v, u \rangle < \gamma\}$. The mechanism of method 601 then sets a and z values such that $$\alpha = \frac{d-1}{2}, \tau = \frac{1+\gamma}{2}$$

Method 601 then makes use of the incomplete beta function $$B(x; \alpha, \beta) := \int_0^x t^{\alpha-1}(1-t)^{\beta-1} dt$$

$$\text{where } B(\alpha, \beta) := B(1; \alpha, \beta) = \frac{\Gamma(\alpha)\Gamma(\beta)}{\Gamma(\alpha+\beta)}.$$

to compute a value for m, such that $$m = \frac{(1-\gamma^2)^\alpha}{2^{d-1}(d-1)(1+e^{\varepsilon'})} \left[ \frac{1}{B(\alpha, \alpha) - B(\tau, \alpha, \alpha)} - \frac{1}{B(\tau, \alpha, \alpha)} \right]$$

Method 601 then sets $$Z = \frac{1}{m} \cdot V$$

and transmits private value Z.

Method 602 is an alternative to the PrivUnit$_2$ mechanism, in which a PrivUnit$_\infty$ is a mechanism based on $\ell_\infty$-unit vectors on the unit cube, i.e $u \in \mathbb{H}^d := \{u \in \mathbb{R}^d = \|u\|_\infty = 1\}$ and returns ε-differentially private vector Z, which has the property that $\mathbb{E}[Z|u]=u$ for all $u \in \mathbb{H}^d$, where the size of Z (its $\ell_\infty$-norm $\|Z\|_\infty$) is as small as possible.

As illustrated, given $u \in \mathbb{H}^d$, $\kappa \in \{0, \ldots, d-1\}$, $\varepsilon' \geq 0$, method 602 includes to round each coordinate of $u = (u_1, \ldots, u_d)$ to a corner of $\mathbb{H}^d$. Then, for $j \in [d]$ do $$\hat{U}_j = \begin{cases} 1 & w.p. \frac{1+u_j}{2} \\ -1 & \text{else} \end{cases}$$

Method 602 additionally includes an operation to draw random vector V according to the following distribution, $$V = \begin{cases} \text{uniform on } \{v \in \{-1, +1\}^d \mid \langle v, \hat{U} \rangle > \kappa\} & \text{with probability } \frac{e^{\varepsilon'}}{e^{\varepsilon'} + 1} \\ \text{uniform on } \{v \in \{-1, +1\}^d \mid \langle v, \hat{U} \rangle \le \kappa\} & \text{otherwise.} \end{cases}$$

An additional operation can be performed to set $$\tau = \frac{\left\lceil \frac{d + \kappa + 1}{2} \right\rceil}{d}$$

and debias the vector $$m = \frac{1}{e^{\varepsilon'} + 1} \cdot \left( \frac{e^{\varepsilon'} \binom{d-1}{d\tau - 1}}{\sum_{\ell = \tau \cdot d}^{d} \binom{d}{\ell}} - \frac{\binom{d-1}{d\tau - 1}}{\sum_{\ell = 0}^{d\tau - 1} \binom{d}{\ell}} \right)$$

Method 602 additionally includes an operation to set $$Z = \frac{1}{m} \cdot V$$

and transmit Z.

An efficient approach to implement the sampling of method 602 is to first sample a Bernoulli B with success probability $$\frac{e^{\varepsilon'}}{e^{\varepsilon'} + 1}.$$

If B=0, then use rejection sampling to generate a uniform random vector V~Uni({−1,1}$^d$) and only accept if ⟨V,Û⟩≤K. Otherwise, if B=1 then sample a conditional Binomial random variable B' with the following CDF and use the inverse transform sampling technique, $$F(t) := \mathbb{P}[B' \le t] = \frac{\sum_{\ell = d\tau}^{t} \binom{d}{\ell}}{\sum_{\ell' = d\tau}^{d} \binom{d}{\ell'}}.$$

The random variable B' indicates the number of coordinates of Û that the random vector V needs to match. Uniform sampling of B' coordinates of Û is performed and corresponding coordinates of V are set to be the same. The remaining coordinates of V are then set to be the flipped value of the corresponding coordinates of Û.

Method 603 generates a privatized magnitude (PrivMagn). Method 603 takes as input r magnitude and v>0 and returns a privatized magnitude r·X, where r=‖W‖$_2$ of a vector w∈ $\mathbb{R}^d$. Method 602 includes to sample Y~Uni[−v,v] and set $$X = 2v \cdot \frac{\exp(Y)}{\exp(v) - \exp(-v)}.$$

Privatized magnitude r·X can then be transmitted to the server.

FIG. 6B illustrates methods 604, 605 to generate privatized magnitudes for transmission to a server. Methods 604 and 605 present two mechanisms for the e-differentially-private release of a single variable (value) r∈[0,r$_{max}$], where r$_{max}$ is some a priori upper bound of r. Method 604 enables mechanism AbsMagnDP, which achieves order optimal scaling for the mean-squared error $\mathbb{E}\left[(Z-r)^2 | r\right]$, which is $$r_{max}^2 e^{-2\varepsilon/3}$$

for ε≥1. Method 605 enables mechanism RelMagnDP, which achieves a truncated relative error guarantee, which for a fixed threshold $\alpha_0 \in [e^{-\varepsilon/2}, 1]$ is $$\mathbb{E}\left[(Z - r)^2 | r\right] = O\left(\max\{r, r_{max}\alpha_0\}^2 (\alpha_0^2 e^{\varepsilon})^{-2/3}\right).$$

For Method 604, a value k∈ $\mathbb{N}$ is fixed. Then r is randomly rounded to an index value J taking values in {0, 1, 2, . . . , k} with the property that $$\mathbb{E}\left[\frac{r_{max} J}{k} \Big| r\right] = r \text{ and } \frac{kr}{r_{max}} \le J \le \frac{kr}{r_{max}}.$$

Next, a random response is employed over k outcomes to obtain Ĵ, which is then debiased to obtain Z, which is an estimator for r.

Method 605 provides an alternate differential privacy mechanism that enables a relative error guarantee. The mechanism provided by method 605 breaks the range r∈ [0, r$_{max}$] into intervals of increasing length based on a fixed accuracy α>0, k∈ $\mathbb{N}$, and v>1. Intervals can be constructed such that $$E_0 = [0, v\alpha], E_i = [v^i\alpha, v^{i+1}\alpha] \text{ for } i = 1, \dots, k-1.$$

Once it is determined which interval to which r belongs, r can be assigned to an end point of the interval at random to obtain an unbiased estimator. A randomized response is then used to obtain Ĵ, which is then debiased to obtain Z, which is an estimator for r.

FIG. 6C illustrates method 606, which enables an optimization that provides for the efficient sampling of unit vectors in PrivUnit$_2$. Specifically, method 606 provides an efficient mechanism to perform the sampling of Z in 601.

Method 606, given u∈ $\mathbb{S}^{d-1}$ and γ∈[0,1], specifies to sample $$Y = \text{Bern}\left(\frac{e^{\varepsilon'}}{e^{\varepsilon} + 1}\right).$$

If Y=1, then sample B'=2B−1 where $$B \sim \text{Beta}\left(\frac{d-1}{2}, \frac{d-1}{2}\right)$$

conditioned on $$B \ge \frac{\gamma + 1}{2};$$

Set $\hat{U} \leftarrow B' \cdot u$; Draw $U \sim \text{Uni}(\mathbb{S}^{d-1})$; Set $$V \leftarrow \sqrt{1-B'^2} \cdot \frac{(I - uu^T)U}{\|(I_d - uu^T) \cdot U\|_2};$$

and Set $V \leftarrow \hat{U}+V$. Otherwise, perform rejection sampling, i.e. Bool←True; while Bool do: Draw $U \sim \text{Uni}(\mathbb{S}^{d-1})$. If $\langle U, u \rangle < \gamma$, then $V \leftarrow U$; Bool=False. Value V can then be provided for use in determining Z as in method 602, where $$Z = \frac{1}{m} \cdot V.$$

Figure 7:
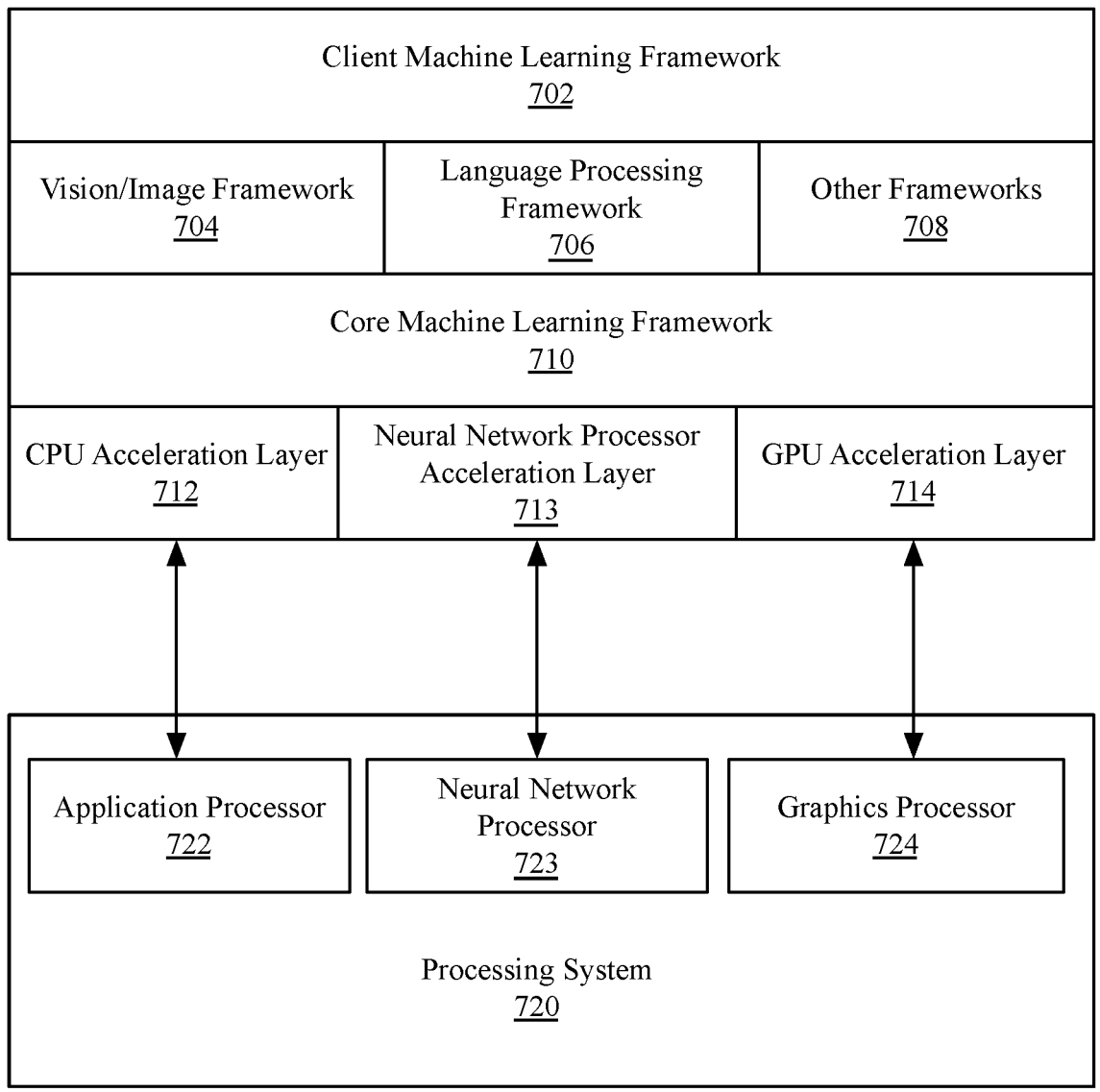
FIG. 7 illustrates compute architecture on a client device that can be used to enable on-device training using machine learning algorithms, according to embodiments described herein.

FIG. 7 illustrates compute architecture 700 on a client device that can be used to enable on-device training using machine learning algorithms, according to embodiments described herein. In one embodiment, compute architecture 700 includes a client machine learning framework 702 that can be configured to leverage a processing system 720 on a client device. The client machine learning framework 702 includes a vision/image framework 704, a language processing framework 706, and one or more other frameworks 708, which each can reference primitives provided by a core machine learning framework 710. The core machine learning framework 710 can access resources provided via a CPU acceleration layer 712, neural network processor acceleration layer 713 and a GPU acceleration layer 714. The CPU acceleration layer 712, neural network processor acceleration layer 713, and the GPU acceleration layer 714 each facilitate access to a processing system 720 on the various client devices described herein.

The processing system includes an application processor 722, a neural network processor 723, and a graphics processor 724, each of which can be used to accelerate operations of the core machine learning framework 710 and the various higher-level frameworks that operate via primitives provided via the core machine learning framework. The application processor 722 and graphics processor 724 include hardware that can be used to perform general-purpose processing and graphics specific processing for the core machine learning framework 710. The neural network processor 723 includes hardware that is tuned specifically to accelerate processing operations for artificial neural networks. The neural network processor 723 can increase speed at which neural network operations are performed but is not required to enable the operation of the client machine learning framework 702. For example, training can also be performed using the application processor 722 and/or the graphics processor 724.

In one embodiment, the various frameworks and hardware resources of the compute architecture 700 can be used for inferencing operations as well as training operations. For example, a client device can use the compute architecture 700 to perform supervised learning via a machine learning model as described herein, such as but not limited to a CNN, RNN, or LSTM model. The client device can then use the trained machine learning model to perform classification operations for one or a variety of predictive models including but not limited to a natural language processing model, a predictive text model, an application suggestion model, and application activity suggestion model, a voice classification model, and an image classification model.

Figure 8:
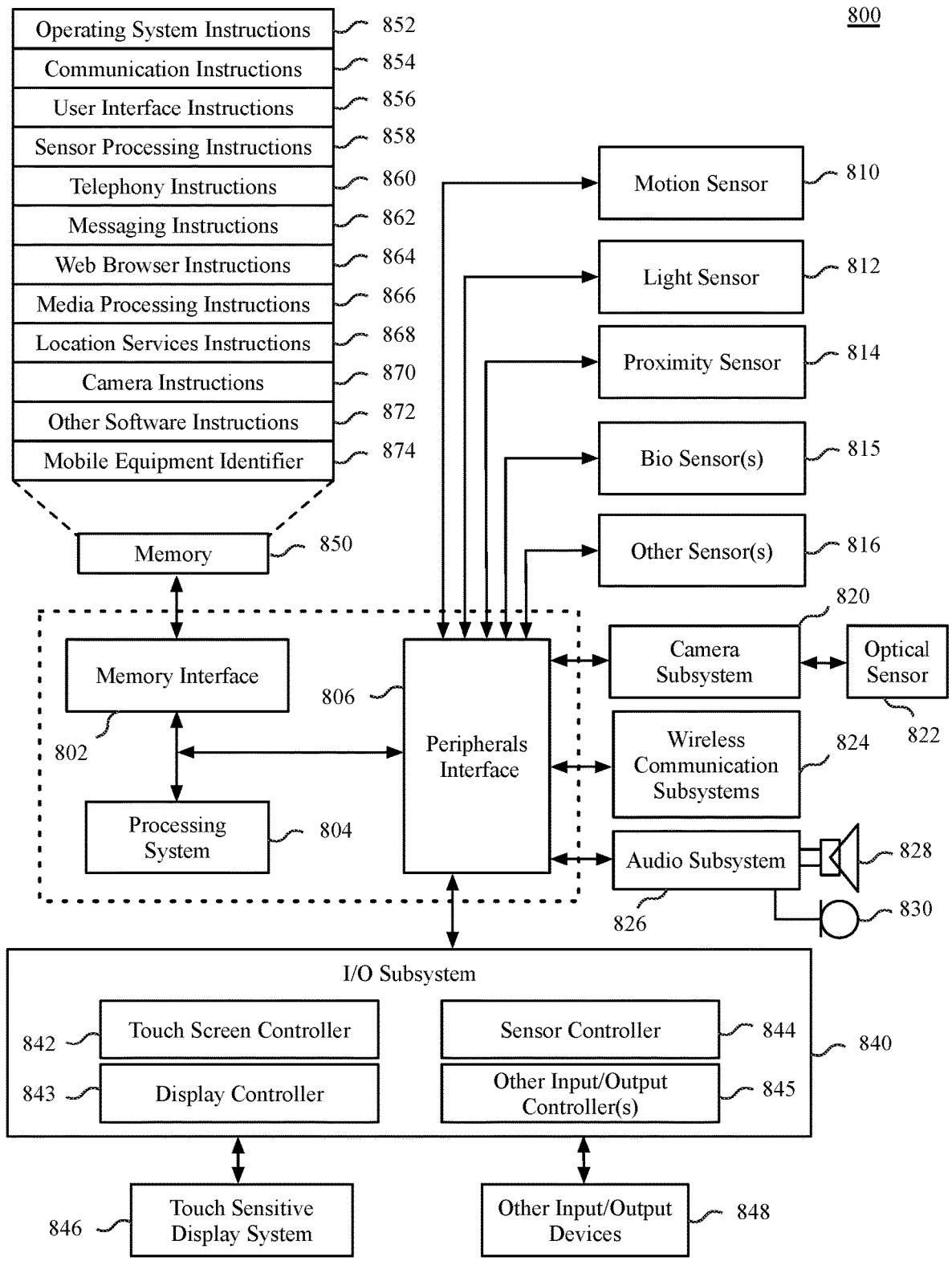
FIG. 8 is a block diagram of a device architecture for a mobile or embedded device, according to an embodiment.

FIG. 8 is a block diagram of a device architecture 800 for a mobile or embedded device, according to an embodiment. The device architecture 800 includes a memory interface 802, a processing system 804 including one or more data processors, image processors and/or graphics processing units, and a peripherals interface 806. The various components can be coupled by one or more communication buses or signal lines. The various components can be separate logical components or devices or can be integrated in one or more integrated circuits, such as in a system on a chip integrated circuit.

The memory interface 802 can be coupled to memory 850, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate the mobile device functionality. One or more biometric sensor(s) 815 may also be present, such as a fingerprint scanner for fingerprint recognition or an image sensor for facial recognition. Other sensors 816 can also be connected to the peripherals interface 806, such as a positioning system (e.g., GPS receiver), a temperature sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the wireless communication subsystems 824 can depend on the communication network(s) over which a mobile device is intended to operate. For example, a mobile device including the illustrated device architecture 800 can include wireless communication subsystems 824 designed to operate over a GSM network, a CDMA network, an LTE network, a Wi-Fi network, a Bluetooth network, or any other wireless network. In particular, the wireless communication subsystems 824 can provide a communications mechanism over which a media playback application can retrieve resources from a remote media server or scheduled events from a remote calendar or event server.

An audio subsystem 826 can be coupled to a speaker 828 and a microphone 830 to facilitate voice-enabled functions, such as voice recognition, voice replication, digital recording, and telephony functions. In smart media devices described herein, the audio subsystem 826 can be a high-quality audio system including support for virtual surround sound.

The I/O subsystem 840 can include a touch screen controller 842 and/or other input controller(s) 845. For computing devices including a display device, the touch screen controller 842 can be coupled to a touch sensitive display system 846 (e.g., touch-screen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment, the display controller 843 can provide frame data to the touch sensitive display system 846 at a variable frame rate.

In one embodiment, a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment, the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (IMEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
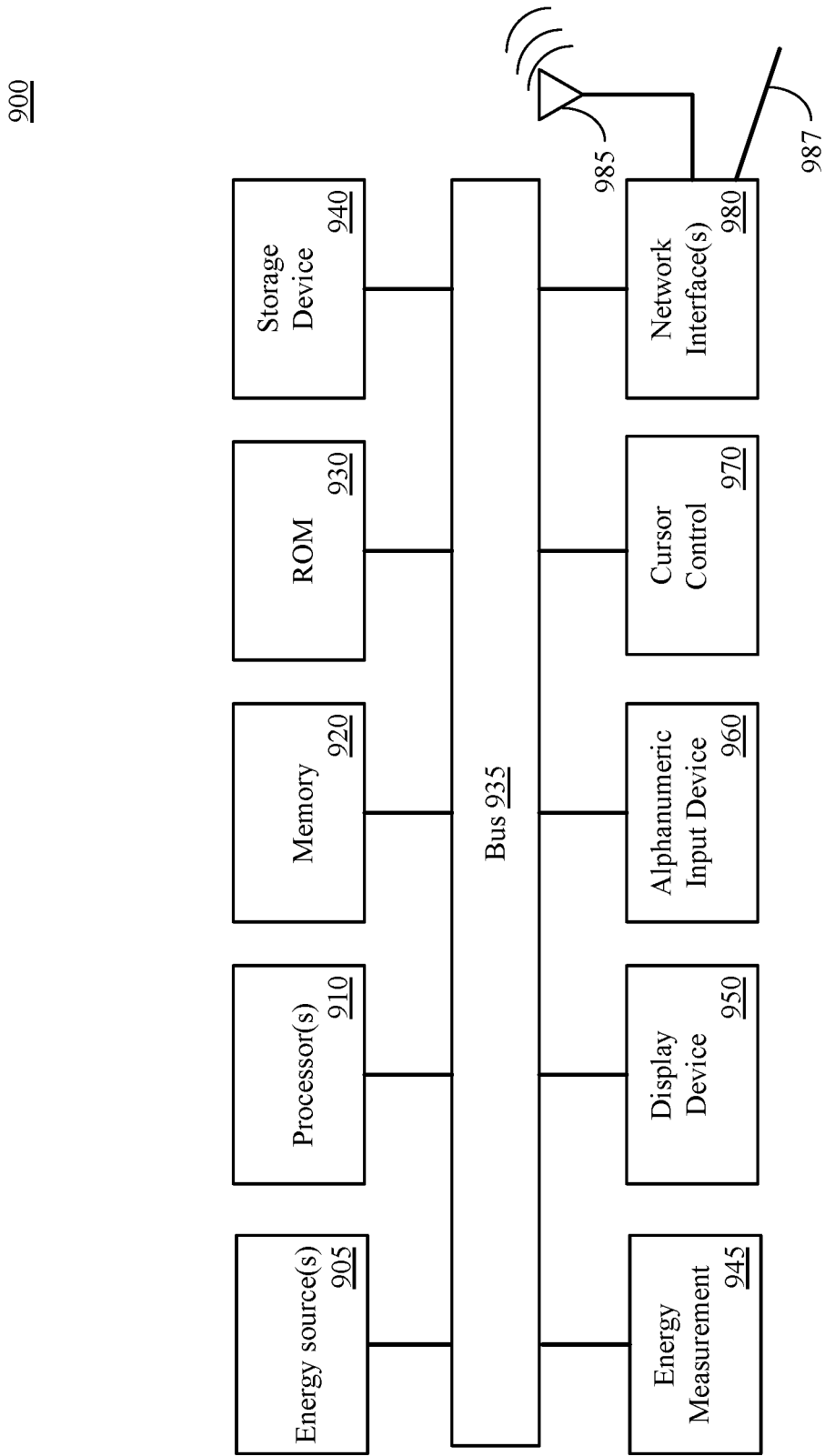
FIG. 9 is a block diagram of a computing system, according to an embodiment.

FIG. 9 is a block diagram of a computing system 900, according to an embodiment. The illustrated computing system 900 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 900 can be used to provide the computing device and/or a server device to which the computing device may connect.

The computing system 900 includes bus 935 or other communication device to communicate information, and processor(s) 910 coupled to bus 935 that may process information. While the computing system 900 is illustrated with a single processor, the computing system 900 may include multiple processors and/or co-processors. The computing system 900 further may include memory 920, such as random-access memory (RAM) or other dynamic storage device coupled to the bus 935. The memory 920 may store information and instructions that may be executed by processor(s) 910. The memory 920 may also be used to store temporary variables or other intermediate information during execution of instructions by the processor(s) 910.

The computing system 900 may also include read only memory (ROM) 930 and/or another data storage device 940 coupled to the bus 935 that may store information and instructions for the processor(s) 910. The data storage device 940 can be or include a variety of storage devices, such as a flash memory device, a magnetic disk, or an optical disc and may be coupled to computing system 900 via the bus 935 or via a remote peripheral interface.

The computing system 900 may also be coupled, via the bus 935, to a display device 950 to display information to a user. The computing system 900 can also include an alphanumeric input device 960, including alphanumeric and other keys, which may be coupled to bus 935 to communicate information and command selections to processor(s) 910. Another type of user input device includes a cursor control 970 device, such as a touchpad, a mouse, a trackball, or cursor direction keys to communicate direction information and command selections to processor(s) 910 and to control cursor movement on the display device 950. The computing system 900 may also receive user input from a remote device that is communicatively coupled via one or more network interface(s) 980.

The computing system 900 further may include one or more network interface(s) 980 to provide access to a network, such as a local area network. The network interface(s) 980 may include, for example, a wireless network interface having antenna 985, which may represent one or more antenna(e). The computing system 900 can include multiple wireless network interfaces such as a combination of Wi-Fi, Bluetooth®, near field communication (NFC), and/or cellular telephony interfaces. The network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, the network interface(s) 980 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 900 can further include one or more energy sources 905 and one or more energy measurement systems 945. Energy sources 905 can include an AC/DC adapter coupled to an external power source, one or more batteries, one or more charge storage devices, a USB charger, or other energy source. Energy measurement systems include at least one voltage or amperage measuring device that can measure energy consumed by the computing system 900 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the hardware can use an instruction set which may be an extension to an instruction set architecture for a particular type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

As described above, one aspect of the present technology is the gathering and use of data available from various specific and legitimate sources to enable crowdsource learning of sequential data. The present disclosure contemplates that in some instances, this gathered data may include personal information data that uniquely identifies or can be used to identify a specific person. Such personal information data can include demographic data, location-based data, online identifiers, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to learn new words, improve keyboard layouts, improve autocorrect engines for keyboards, and to enable an electronic device to better anticipate the needs of a user. Further, other uses for personal information data that benefit the user are also contemplated by the present disclosure. For instance, health and fitness data may be used, in accordance with the user's preferences, to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, crowdsourcing of sequences can be performed over a large number of users and is based on aggregated, non-personal information data. A large number of individual users can opt out of sending data to the sequence learning server and overall trends can still be detected.

In the foregoing description, example embodiments of a private federated learning system have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment described herein provides for a non-transitory machine-readable medium storing instructions to cause one or more processors of a data processing system to perform operations comprising receiving a machine learning model from a server at a client device, training the machine learning model using local data at the client device, generating an update for the machine learning model, the update including a weight vector that represents a difference between the received machine learning model and the trained machine learning model, privatizing the update for the machine learning model, and transmitting the privatized update for the machine learning model to the server.

One embodiment described herein provides for a data processing system comprising a memory to store instructions and one or more processors to execute the instructions. The instructions cause the one or more processors to receive a machine learning model from a server at a client device, train the machine learning model using local data at the client device to generate a trained machine learning model, generate an update for the machine learning model, the update including a weight vector that represents a difference between the machine learning model and the trained machine learning model, privatize the update for the machine learning model, and transmit the privatized update for the machine learning model to the server.

One embodiment described herein provides for a method comprising receiving a machine learning model from a server at a client device, training the machine learning model using local data at the client device to generate a trained machine learning model, generating an update for the machine learning model, the update including a weight vector that represents a difference between the machine learning model and the trained machine learning model, privatizing the update for the machine learning model, and transmitting the privatized update for the machine learning model to the server.

In the embodiments described herein, local model updates generated by user devices are privatized using mechanisms that can be shown to be sufficient to guarantee strong reconstruction protections for high-dimensional data for a large range of $\in$, $\rho$ parameters when the adversary knows relatively little a priori about the actual input. The various privacy mechanisms described herein can be employed without reducing the utility of the data for learning operations.

In some embodiments, separated differential privacy mechanisms are employed. The separated differential privacy mechanisms can decompose a model update into a unit vector and magnitude, then separately privatize the unit vector and magnitude for each update to the machine learning model before the update is transmitted by the user device. In one embodiment the magnitude is privatized with absolute error. In one embodiment the magnitude is privatized with relative error. In one embodiment the unit vector is privatized based on $\ell_2$-unit vectors on the unit cube. In one embodiment, the unit vector is privatized based on $\ell_\infty$-unit vectors on the unit cube.

The machine learning models described herein can be used in a variety of applications, including natural language processing, mage classification, or voice classification. After a model is updated using aggregated model updates, the updated model, or the simply the updates to the model, can be re-transmitted to the client devices for further training and updates.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A non-transitory machine-readable medium storing instructions to cause one or more processors of a data processing system to perform operations comprising:
    receiving a machine learning model from a server at a client device;
    training the machine learning model using local data at the client device to generate a trained machine learning model;
    determining a weight vector that is a difference between first weights of the machine learning model and second weights of the trained machine learning model;
    generating an update for the machine learning model, the update including the weight vector;
    privatizing the update for the machine learning model by separately privatizing a magnitude and a unit vector of the update; and
    transmitting the privatized update for the machine learning model to the server.

2. The non-transitory machine-readable medium as in claim 1, wherein privatizing the update for the machine learning model includes privatizing the update using separated differential privacy, wherein privatizing the update using separated differential privacy includes:
decomposing the weight vector into the unit vector and the magnitude.

3. The non-transitory machine-readable medium as in claim 2, wherein the magnitude is privatized using relative noise.

4. The non-transitory machine-readable medium as in claim 2, wherein the unit vector and the magnitude are each differentially private.

5. The non-transitory machine-readable medium as in claim 4, wherein the magnitude is privatized with absolute error.

6. The non-transitory machine-readable medium as in claim 4, wherein the magnitude is privatized with relative error.

7. The non-transitory machine-readable medium as in claim 4, wherein the unit vector is privatized based on $\ell_2$-unit vectors on a unit cube.

8. The non-transitory machine-readable medium as in claim 4, wherein the unit vector is privatized based on $\ell_\infty$-unit vectors on a unit cube.

9. The non-transitory machine-readable medium as in claim 1, wherein the machine learning model is a natural language processing model, an image classification model, or a voice classification model.

10. The non-transitory machine-readable medium as in claim 9, additionally comprising receiving an updated machine learning model from the server at the client device, training the updated machine learning model using local data at the client device, and transmitting a privatized update for the updated machine learning model to the server.

11. A data processing system comprising:
a memory to store instructions;
one or more processors to execute the instructions, wherein the instructions cause the one or more processors to:
receive a machine learning model from a server at a client device;
train the machine learning model using local data at the client device to generate a trained machine learning model;
generate a weight vector by subtracting first weights of the received machine learning model from second weights of the trained machine learning model;
generate an update for the machine learning model, the update including the weight vector;
privatize the update for the machine learning model by separately privatizing a magnitude and a unit vector of the update; and
transmit the privatized update for the machine learning model to the server.

12. The data processing system as in claim 11, wherein to privatize the update for the machine learning model includes to privatize the update using separated differential privacy, wherein to privatize the update using separated differential privacy includes to:
decompose the weight vector into the unit vector and the magnitude.

13. The data processing system as in claim 12, wherein the magnitude is privatized using relative noise.

14. The data processing system as in claim 12, wherein the unit vector and the magnitude are each differentially private.

15. The data processing system as in claim 14, wherein the magnitude is privatized with absolute error.

16. The data processing system as in claim 14, wherein the magnitude is privatized with relative error.

17. The data processing system as in claim 14, wherein the unit vector is privatized based on $\ell_2$-unit vectors on a unit cube.

18. The data processing system as in claim 14, wherein the unit vector is privatized based on based on $\ell_\infty$-unit vectors on a unit cube.

19. The data processing system as in claim 11, wherein the machine learning model is a natural language processing model, an image classification model, or a voice classification model.

20. The data processing system as in claim 19, the one or more processors additionally to: receive an updated machine learning model from the server at the client device; train the updated machine learning model using local data at the client device; and transmit a privatized update for the updated machine learning model to the server.

21. A method comprising:
receiving a machine learning model from a server at a client device;
training the machine learning model using local data at the client device to generate a trained machine learning model;
determining a weight vector that is a difference between first weights of the machine learning model and second weights of the trained machine learning model;
generating an update for the machine learning model, the update including the weight vector;
privatizing the update for the machine learning model by separately privatizing a magnitude and a unit vector of the update; and
transmitting the privatized update for the machine learning model to the server.

22. The method as in claim 21, wherein privatizing the update for the machine learning model includes privatizing the update using separated differential privacy, wherein privatizing the update using separated differential privacy includes:
decomposing the weight vector into the unit vector and the magnitude.

23. The method as in claim 22, wherein the magnitude is privatized using relative noise.

24. The method as in claim 22, wherein the unit vector and the magnitude are each differentially private.

25. The method as in claim 24, wherein the magnitude is privatized with absolute error.

26. The method as in claim 24, wherein the magnitude is privatized with relative error.

27. The method as in claim 24, wherein the unit vector is privatized based on $\ell_2$-unit vectors on a unit cube.

28. The method as in claim 24, wherein the unit vector is privatized based on $\ell_\infty$-unit vectors on a unit cube.

29. The method as in claim 21, wherein the machine learning model is a natural language processing model, an image classification model, or a voice classification model.

30. The method as in claim 29, additionally comprising receiving an updated machine learning model from the server at the client device, training the updated machine learning model using local data at the client device, and transmitting a privatized update for the updated machine learning model to the server.

* * * * *

UNITED STATES PATENT AND TRADEMARK OFFICE
CERTIFICATE OF CORRECTION

PATENT NO. : 11,989,634 B2
APPLICATION NO. : 16/501132
DATED : May 21, 2024
INVENTOR(S) : Abhishek Bhowmick et al.

Page 1 of 1

It is certified that error appears in the above-identified patent and that said Letters Patent is hereby corrected as shown below:

In the Claims

Column 24, Line 9 (Claim 18): "privatized based on based on" should read --privatized based on--.

Signed and Sealed this
Sixteenth Day of July, 2024

Katherine Kelly Vidal
*Director of the United States Patent and Trademark Office*